(12) United States Patent
Okimoto et al.

(10) Patent No.: US 6,978,022 B2
(45) Date of Patent: Dec. 20, 2005

(54) SYSTEM FOR SECURING ENCRYPTION RENEWAL SYSTEM AND FOR REGISTRATION AND REMOTE ACTIVATION OF ENCRYPTION DEVICE

(75) Inventors: John I. Okimoto, San Diego, CA (US); Lawrence W. Tang, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 833 days.

(21) Appl. No.: 09/898,168

(22) Filed: Jul. 3, 2001

(65) Prior Publication Data

US 2002/0051539 A1  May 2, 2002

Related U.S. Application Data

(60) Provisional application No. 60/263,087, filed on Jan. 18, 2001, provisional application No. 60/243,925, filed on Oct. 26, 2000.

(51) Int. Cl.[7] ............................ H04N 7/167; H04L 9/00
(52) U.S. Cl. ...................... 380/211; 380/201; 713/167; 713/193; 713/201
(58) Field of Search ...................... 380/202, 211, 217

(56) References Cited

U.S. PATENT DOCUMENTS 5,613,012 A * 3/1997 Hoffman et al. ............ 382/115
5,627,892 A * 5/1997 Kauffman ................... 380/212
6,363,149 B1 * 3/2002 Candelore ..................... 380/45
6,771,657 B1 * 8/2004 Elstermann ................. 370/465

FOREIGN PATENT DOCUMENTS

| WO | WO 98/43426 A1 | 10/1998 |
| WO | WO 00/45306 A1 | 8/2000 |
| WO | WO 00/67483 A1 | 11/2000 |

* cited by examiner

Primary Examiner—Kambiz Zand
(74) Attorney, Agent, or Firm—Townsend and Townsend and Crew LLP

(57) ABSTRACT

An encryption renewal system for generating entitlement control messages, the system being secured by physical separation of components. The encryption renewal system has a first computing platform for performing non-secure tasks associated with one or more control messages that transmit one or more keys to a subscriber; and a second computing platform physically separate from the first computing platform containing one or more application specific integrated circuit chip for generating the one or more control messages. In addition, a method by the encryption renewal system is used to register an off-line encryption device in order to begin encrypting clear content. The method includes generating data for registering the off-line encryption device; encrypting the data with one or more cryptographic keys to form encrypted data; forwarding the encrypted data to the off-line encryption device; and retrieving the data from the encrypted data, wherein the off-line encryption device begins to encrypt clear content only after the data is retrieved.

24 Claims, 3 Drawing Sheets

SYSTEM FOR SECURING ENCRYPTION RENEWAL SYSTEM AND FOR REGISTRATION AND REMOTE ACTIVATION OF ENCRYPTION DEVICE

CROSS-REFERENCES TO RELATED APPLICATIONS

This application claims priority from U.S. Provisional Application No. 60/243,925, entitled "SYSTEM FOR CONTENT DELIVERY OVER A COMPUTER NETWORK," filed on Oct. 26, 2000 and U.S. Provisional Application 60/263,087, entitled "SYSTEM FOR SECURELY DELIVERING ENCRYPTED CONTENT ON DEMAND WITH ACCESS CONTROL," filed Jan. 18, 2001. These applications are incorporated herein by reference for all purposes. This application is also related to the following U.S. Non provisional applications, U.S. patent application Ser. No. 08/420,710, now U.S. Pat. No 5,627,892, entitled "DATA SECURITY SCHEME FOR POINT-TO-POINT COMMUNICATION SESSIONS," filed Apr. 19, 1995; U.S. patent application Ser. No. 09/898,136, entitled "SYSTEM FOR DENYING ACCESS TO CONTENT GENERATED BY A COMPROMISED OFF LINE ENCRYPTION DEVICE AND FOR CONVEYING CRYPTOGRAPHIC KEYS FROM MULTIPLE CONDITIONAL ACCESS SYSTEMS," filed Jul. 3, 2001; U.S. patent application Ser. No. 09/898,184, entitled "SYSTEM FOR SECURELY DELIVERING PRE-ENCRYPTED CONTENT ON DEMAND WITH ACCESS CONTROL," filed Jul. 3,2001, all of which are hereby incorporated by reference in their entirety as if set forth in full in the present invention, for all purposes.

BACKGROUND OF THE INVENTION

The present invention relates generally to the field of content communication and more specifically to a system for communicating video content on demand through a communication network.

Conventional systems for delivering video content on demand to subscribers are becoming well known. VOD (video on demand) is an interactive service in which content (e.g., video) is delivered to a subscriber over a point-to-multipoint network (e.g., a cable system) on an on-demand basis. A subscriber may order and receive programming content at any time, without adhering to a pre-defined showing schedule. The subscriber is often provided VCR-like motion control functions, such as pause (freeze frame), slow motion, scan forward, and slow backward. The subscriber is typically allowed multiple viewing of a purchased program within a time window, e.g., 24 hours. VOD mimics (or exceeds) the level of control and convenience of rental video tapes. For a VOD service to prevent unauthorized access, the system implementing it provides some form of conditional access.

Conditional Access

The system implementing VOD provides the capability to limit content access to authorized subscribers only, as the contents delivered as part of the service are generally considered valuable intellectual properties by their owners. In cable and satellite television, such capability is known as conditional access. Conditional access requires a trustworthy mechanism for classifying subscribers into different classes, and an enforcement mechanism for denying access to unauthorized subscribers. Encryption is typically the mechanism used to deny unauthorized access to content (as opposed to carrier signal).

Tiering of Services

To distinguish between authorized and unauthorized subscribers, and between different levels of authorization, a concept of class of services is employed. A "tier" in conventional cable or satellite TV terminology, is a class of services. It can also be viewed as a unit of authorization, or an access privilege that can be granted, revoked, or otherwise managed.

Key Management

In a system that employs encryption, key management refers to all aspects of the handling of cryptographic keys, including their generation, distribution, renewal, expiration, and destruction. The goal of key management to make sure that all parties can obtain exactly the cryptographic keys to which are authorized under an access control policy. Access control is effected by careful control over the distribution of keys. In a conditional access system for cable systems, conditional access is implemented with the use of two classes of control messages: entitlement control messages (ECMs) and entitlement management messages (EMMs).

Entitlement Management Messages

EMMs are control messages that convey access privileges to subscriber terminals. Unlike ECMs (entitlement control messages) which are embedded in transport multiplexes and are broadcast to multiple subscribers, EMMs are sent unicast-addressed to each subscriber terminal. That is, an EMM is specific to a particular subscriber. In a typical implementation, an EMM contains information about the periodical key, as well as information that allows a subscriber terminal to access an ECM which is later sent. EMMs also defines the tiers for each subscriber. With reference to cable services, for example, a first EMM may allow access to HBO™, ESPN™ and CNN™. A second EMM may allow access to ESPN™, TNN™ and BET™, etc.

Entitlement Control Messages

In a conditional access system, each content stream is associated with a stream of ECM that serves two basic functions: (1) to specify the access requirements for the associated content stream (i.e., what privileges are required for access for particular programs); and (2) to convey the information needed by subscriber terminals to compute the cryptographic key(s), which are needed for content decryption. ECMs are transmitted in-band alongside their associated content streams. Typically, ECMs are cryptographically protected by a "periodical key" which changes periodically, usually on a monthly basis. The periodical key is typically distributed by EMMs prior to the ECMs, as noted above.

Encryption

In a cable system, carrier signals are broadcast to a population of subscriber terminals (also known as set-top boxes). To prevent unauthorized access to service, encryption is often employed. When content is encrypted, it becomes unintelligible to persons or devices that don't possess the proper cryptographic key(s). A fundamental function of a conditional access system is to control the distribution of keys to the population of subscriber terminal, to ensure that each terminal can compute only the keys for the services for which it is authorized. Traditionally, in broadcast services, an encryption device is placed on the signal path before the signal is placed on the distribution network. Thereafter, the encryption device encrypts the signal and its content in real time. This technique is acceptable because a large number of subscribers share the same (relatively small number of) content streams.

Disadvantageously, for VOD, real-time encryption poses much greater cost and space issues. A medium-sized cable system may have, for example, 50,000 subscribers. Using a common estimate of 10% peak simultaneous usage, there can be up to 5000 simultaneous VOD sessions during the peak hours. A typical encryption device can process a small number of transport multiplexes (digital carriers). A relatively large number of real-time encryption devices will be needed to handle the peak usage in the example system. Such a large amount of equipment not only adds significantly to the system cost, but also poses a space requirement challenge.

One solution to the aforementioned problem is disclosed in co-pending related application entitled SYSTEM FOR SECURELY DELIVERING PRE-ENCRYPTED CONTENT ON DEMAND WITH ACCESS CONTROL, U.S. Ser. No. 09/898,184 filed, Jul. 3, 2001, which is hereby incorporated by reference in its entirety. In U.S. Ser. No. 09/898,184, a system is disclosed that encrypts content offline (typically before the content is requested by the user) before it is distributed to point-to-point systems such as cable systems. The system allows content to be encrypted once, at a centralized facility, and to be useable at different point-to-point systems. Advantageously, the pre-encrypted contents in the present invention have indefinite lifetimes. The system periodically performs an operation called ECM retrofitting, enabling the content to be useable in multiple systems and useable multiple times in the same system. The amount of data being processed during ECM retrofitting is very small (on the order of several thousand bytes). There is no need to reprocess the pre-encrypted contents. This is a significant advantage, as several thousand bytes represent only a tiny fraction of the size of a typical 2-hour video program, which can be about 3 gigabytes (3,000,000,000 bytes) in size.

In a first embodiment, the system of U.S. Ser. No. 09/898,184, includes a content preparation system (CPS) containing an off-line encryption system (OLES) for pre-encrypting the content offline to form pre-encrypted content; an encryption renewal system (ERS) for generating entitlement control messages (ECMs) that allow the pre-encrypted content to be decrypt-able for a designated duration; and a conditional access system (CAS) for granting conditional access to receiving units. The ERS, in a first aspect, is connected to the public Internet and is readily accessible to the world wide web, which makes the ERS susceptible to access by unauthorized parties. Since the ERS handles highly sensitive information, it must be protected and secured from unauthorized access.

Regarding the OLES, it must be activated in order to begin encrypting clear content off-line. Activation occurs only after information regarding OLES' users and operating conditions are determined since at manufacture time, there is no indication as to what these conditions are. Further, cryptographic parameters are needed to activate the OLES which parameters must be unique so that information is useable only in the system for which it is intended. Moreover, such information must be remain hidden and be resistant to tampering.

Therefore, there is a need to resolve the aforementioned problems relating to a system for securely delivering pre-encrypted content, and the present invention meets this need.

BRIEF SUMMARY OF THE INVENTION

A first aspect of the present invention discloses a system for securely delivering encrypted content on demand with access control. The system encrypts the content prior to being distributed through a point to point communication system (e.g., cable systems, for example). Content is encrypted once at a centralized facility and is useable at different point-to-point systems. Advantageously, the pre-encrypted contents in the present invention have indefinite lifetimes.

In an alternate aspect, the system includes an ERS (encryption renewal system) for performing an operation called ECM (entitlement control message) retrofitting to keep pre-encrypted contents usable. Because the ERS handles highly sensitive data such as periodical keys, the present invention separates ERS components into two or more computing platforms to protect the data. The first platform which may be publicly accessible over the Internet for example, handles non-secure processing of information related to the ECM retrofitting process while the second platform is physically separated to handle secure processing.

Further yet, the ERS is employed to implement a two-step registration of an OLES (off-line encryption device). Prior to operation, the OLES requires certain cryptographic parameters for encrypting content from the ERS. This is because it is the ERS that provides retrofitting which eventually allows content encrypted by the OLES to be decryptable. At the time of manufacture, a set of cryptographic keys are stored in the OLES and the ERS. Thereafter, the keys are employed to encrypt the cryptographic parameters forwarded to the OLES. Only after receiving the cryptographic parameters is the OLES activated.

In an alternate aspect of the present invention, the encryption renewal system comprises a first computing platform for performing non-secure tasks associated with one or more control messages that transmit one or more keys to a subscriber; and a second computing platform physically separate from the first computing platform containing one or more application specific integrated circuit chip for generating the one or more control messages.

According to another aspect of the present invention, a database for storing the keys to be included in the control messages is disclosed.

According to another aspect of the present invention, a third computing platform physically separate from the first computing platform for performing secure tasks associated with the control messages is disclosed.

According to another aspect of the present invention, an encryption renewal system, comprising: means for receiving an entitlement management message containing one or more cryptographic keys which allows a subscriber of a point to point communication system to access pre-encrypted content; means for extracting the cryptographic key from the entitlement management message, said means for extracting being physically separate from the means for receiving; and means for storing the one or more cryptographic keys, said means for receiving and means for extracting performing non-secure and secure processing, respectively, of tasks associated with extracting the one or more cryptographic keys is disclosed.

According to another aspect of the present invention, the means for extracting further comprises an application specific integrated circuit chip for extracting the one or more cryptographic keys.

According to another aspect of the present invention, the means for storing stores information about which video on demand system is associated with the conditional access system.

According to another aspect of the present invention, a method of registering an off-line encryption device in order to begin encrypting clear content, the method using a remotely located encryption renewal system, the method comprising: generating data for registering the off-line encryption device; encrypting the data with one or more cryptographic keys to form encrypted data; forwarding the encrypted data to the off-line encryption device; and retrieving the data from the encrypted data, wherein the off-line encryption device begins to encrypt clear content only after the data is retrieved is disclosed.

According to another aspect of the present invention, the method comprises storing the one or more cryptographic keys prior to generating data.

According to another aspect of the present invention, the one or more cryptographic keys include any one or more of a secret shared key, a private key, and a public key.

DETAILED DESCRIPTION OF THE INVENTION

A first embodiment of the present invention discloses a system for securely delivering encrypted content on demand with access control. The system encrypts the content prior to being distributed through a point to point communication system (e.g., cable systems, for example). Although described with reference to point-to-point systems, the present invention is applicable to point-to-multipoint systems. Content is encrypted once at a centralized facility and is usable at different point-to-point systems. Advantageously, the pre-encrypted contents in the present invention have indefinite lifetimes. The system includes an ERS (encryption renewal system) for performing an operation called ECM retrofitting to keep pre-encrypted contents usable.

Because it handles highly sensitive data such as periodical keys, the present invention separates the ERS into two or more computing platforms to protect the data. The first platform which may be publicly accessible over the Internet for example, handles non-secure processing of information related to the ECM retrofitting process while the second platform is physically separated to handle secure processing.

Further yet, the ERS is employed to implement a two-step registration of an OLES (off-line encryption device). Prior to operation, the OLES requires certain cryptographic parameters for encrypting content from the ERS. This is because it is the ERS that provides retrofitting which eventually allows content encrypted by the OLES to be decryptable. At the time of manufacture, a set of cryptographic keys are stored in the OLES. Also, the same keys are stored in the ERS, and thereafter employed to encrypt the cryptographic parameters forwarded to the OLES. Only after receiving the cryptographic parameters is the OLES activated.

Figure 1:
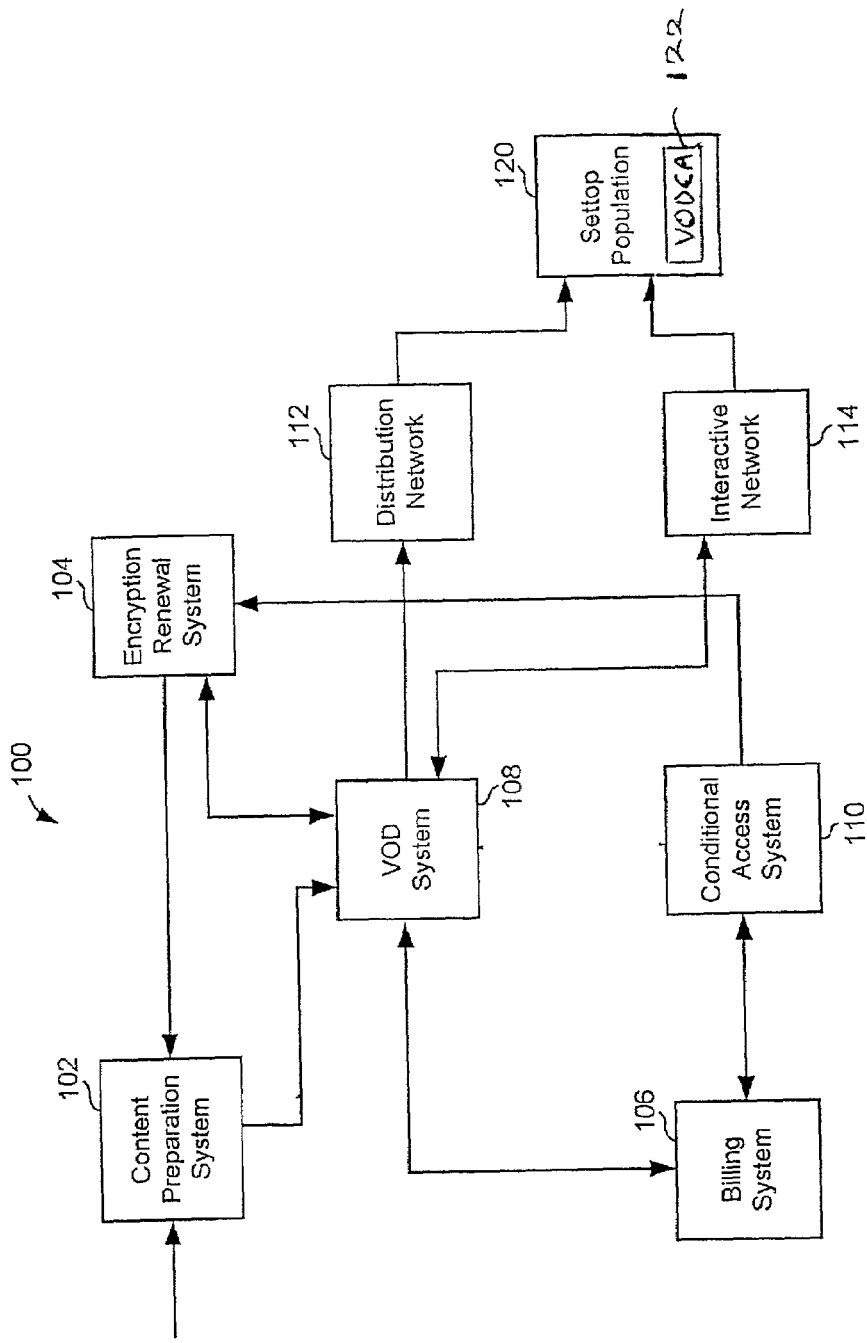
FIG. 1 is a system architecture for delivering encrypted content to a subscriber in accordance with a first embodiment of the present invention.

FIG. 1 is a system architecture 100 for delivering encrypted content to a subscriber in accordance with a first embodiment of the present invention.

Among other components, system architecture 100 comprises a content preparation system (CPS) 102 for pre-encrypting content, video on demand (VOD) system 108 storing encrypted programs for distribution to subscribers on an on demand basis, conditional access system 110 for controlling one or more keys granting access to pre-encrypted content, an encryption renewal system 104 ERS accepting requests from the video on demand system to generate new entitlement control messages for pre-encrypted content, a distribution network 112 for distributing content, and an interactive network 114 providing two-way interaction between the subscriber and the content system. Although not shown, one of ordinary skill in the art would realize that other components and arrangement for achieving the various functionalities of system architecture 100 are possible. For example, VOD system may be coupled directly to CAS 110 and functionalities consolidated in both components since both components are typically located within a cable system head end.

In operation, the VOD system 108 is installed to provide VOD to subscribers. Before going live, VOD system 108 goes through a registration process with the ERS 104. This establishes the identity of the VOD system 108 to the ERS so it can produce proper and appropriate responses specific to that VOD system installation. Once the VOD system registration is complete, content may be added to the VOD system and made available to subscribers. Clear content (a), such as a movie, originates from a content provider and begins its entry to the VOD at CPS 102. Here, the clear content is encrypted using an Off Line Encryption System (OLES) (not shown), which pre-encrypts the content in preparation for delivery by VOD system 108. The OLES also generates an encryption record associated with the encrypted content. Note that the VOD system may keep the encryption record with the pre-encrypted content at all times as it identifies the content for later processing and decryption within VOD system 108.

Once the clear content is encrypted at the OLES, the resulting pre-encrypted content and associated encryption record are delivered to VOD system 108 for storage on the local server. Advantageously, multiple VOD systems may be coupled to CPS 102 such that content is encrypted once and distributed to the systems. VOD system 108 is responsible for keeping the pre-encrypted content and associated encryption record together. Before the pre-encrypted content may be requested or viewed by subscribers in their homes, VOD system 108 obtains suitable Entitlement Control Messages (ECMs) from the ERS 104. The VOD system submits an ECM request to ERS 104, containing the encryption record (c) for the desired pre-encrypted content.

ERS 104 responds with the proper ECMs. The ECMs are created specifically for the particular pre-encrypted content and particular point-to-point system within which the VOD system operates, and for a particular time period. The ECMs encrypt content using a key (typically periodical) provided by each conditional access system (CAS 110 in the present case) controlling the set-top boxes. VOD system (108) inserts the received ECMs into the streams along with the pre-encrypted content whenever it is spooled out to a subscriber. The ECMs are inserted into the streams with the content.

It should be observed that ECMs returned to VOD system 108 by ERS 104 are valid and usable with the pre-encrypted content only for a limited time—the exact time, determined by CAS 110, is not predictable in advance. Thus, the callback time returned with the ECMs indicates the time by which VOD system 108 should check with the ERS to see if ECMs for all pre-encrypted content may be updated. When the VOD system receives the callback time it should be stored and tracked against the current time. If the callback time is reached and the VOD system 108 has not contacted ERS 104 in the intervening time, then VOD system 108 attempts to contact the ERS 104 even if it has no new ECM requests to fulfill.

Content Preparation System (CPS)

In FIG. 1, content preparation system (CPS) 102 is a centralized facility for preparing contents according to the requirements of the VOD system (VOD) 108 and those of the Conditional Access system (CAS) 110. CPS 102 encodes content in a format (e.g., MPEG-2) suitable for storage on video servers and for distribution to the subscriber terminals. For content that is already available in the suitable format, this encoding step may be unnecessary. CPS 102 also functions to encrypt digitally encoded content according to the specifications of CAS 110.

The encryption process involves generating one or a series of cryptographic keys. As part of the encryption process, the cryptographic keys, or the parameters used in their generation, are saved in a data structure called an encryption record. The encryption record is protected by encryption to prevent unauthorized access to the keys. CPS 102 may package encrypted programs with the associated encryption records, which may additionally contain useful but nonessential information about the content. Such information may include program title, identification of the program assigned by different parties, encoding parameters, program length, etc. CPS 102 may serve multiple cable systems or multiple point-to-point systems. The content preparation process described above produces encoded and encrypted content ready for distribution to VOD systems across a diverse geographic area. Some potential methods of content file distribution are via physical media, network file transfer, or satellite file transfer.

Although not shown, CPS 102 includes an OLES (off line encryption) device for performing the aforementioned functionality. The OLES uses one or more non-real-time, or offline, encryption devices to encrypt content. A given OLES generates program-specific cryptographic keys that are used to encrypt content. The OLES is protected by physical security including physical access control and secure packaging. The OLES includes functions such as accepting encryption control provisioning parameters from the ERS including cryptographic information to support content encryption; selecting one or more cryptographic keys based on the encryption control parameters and system configuration, which keys are used for encrypting the program content; generating an encryption record, which contains information about the keys used to encrypt the content. This record itself is encrypted to maintain the security of the encryption record; encrypting the program content using the chosen keys; and providing the encrypted content and the encryption record to the CPS, for subsequent transfer to at least one VODS.

Typically, an OLES is registered and authorized by the ERS 104 prior to having ability to perform encryption operations. ERS 104 provides a removable disk containing authorization and configuration parameters for the OLES, such data being processed during initial setup. Further, a "select packet" operating mode is provided in which certain input MPEG packets are not encrypted. When operating in this mode, the value "00" in the transport scrambling control field (TSCF) of the MPEG packet header indicates that the packet shall not be encrypted. If the values "11" or "10" appear in a packet TSCF, then the OLES encrypts the packet per the Crypto period duration defined for the encryption mode.

Other modes include the OLES supporting a batch operating mode in which content to be encrypted is copied into the OLES native file system, e.g., NTFS, and a real-time streaming encryption mode in which an MPEG compliant transport stream containing one program is delivered to the OLES via the network interface. As noted, as part of the encryption process, the cryptographic keys or the parameters used in their generation, are saved by the OLES in a data structure called an encryption record.

The OLES is capable of processing an MPEG content in an off-line manner whereby the raw content has been completely encoded and is obtainable from a server (VOD or other server) or has been placed onto the OLES system. One of ordinary skill will realize that the above guidelines are exemplary and other embodiments having different guidelines are possible.

Video On Demand System (VOD System)

VOD system 108 comprises one or more video servers adapted for video on demand applications. The servers store encrypted programs for distribution to subscribers on an on demand basis. Thereafter, the pre-encrypted programs are routed and streamed to the authorized subscribers. In addition, VOD system 108 accepts purchase requests from subscriber terminals, and validates and authorizes such purchase requests as appropriate. In some instances, after a purchase request is approved, the VOD purchases may be temporarily stored until requested by the subscriber.

In addition to temporary storage of purchases, VOD system 108 may accept motion control requests from subscriber terminals, and accordingly perform such requests by controlling the streaming of content to the subscriber. In a first embodiment, VOD system 108 manages system resources related to video on demand and the like such as bandwidth management, for example. VOD system 108 interfaces with other components of content system 100 to provide various functions. For example, it interfaces with a video on demand client application (VODCA) (not shown) executing on subscriber terminals for providing user interfaces to the subscribers. Further, VOD system 108 is communicably coupled with the Billing system (BS) to report purchases, and to the Encryption Renewal System (ERS) to periodically request ECMs for pre-encrypted programs.

VOD system 108 typically resides within the cable system. Nonetheless, the exact location of the equipment constituting VOD system 108 is variable and does not affect the workings of the present invention. In a cable system built using hybrid fiber-coax (HEFC) technology, VOD system 108 may be located at the head-end. Alternatively, VOD system 108 may have equipment in multiple locations, including the head end and the distribution hubs in the network. VOD system 108 may be located off-site and may serve one or more cable systems. VOD systems generally are well known in the art and need not be described in detail. Thus, VOD system 108 may comprise off the shelf items including hardware and software and/or customizable software in accordance with one embodiment of the present invention.

Conditional Access System (CAS)

As noted, content system 100 includes a conditional access system (CAS) 110. CAS 110 permits access to pre-encrypted content by subscriber terminals by provisioning them with EMMs, and generating ECMs for non-VOD services. Other functions of CAS 110 include controlling real-time encryption devices in the cable system; reporting the (scheduled) occurrence of periodical key changes to the encryption renewal system (described below), and transmitting cable system-specific cryptographic parameters (e.g., periodical keys) to the encryption renewal system to enable ECM retrofitting. CAS 110 may be located either on site or off site, and may serve multiple cable systems, in which case CAS 110 acts as multiple logical conditional access systems. Furthermore, CAS 110 interfaces with the Billing System to obtain authorization information about each subscriber, and to report purchases to the Billing System. CAS systems are well known in the art and may comprise off the shelf items. In addition, one of ordinary skill in the art such as a programmer can develop code as may be necessary to accommodate the present invention.

Billing System (BS)

BS 106 interfaces with both VOD system 108 and CAS 110 to provide the following functions: (1) accepting subscription and service change requests from subscribers; (2) maintaining subscriber account information; (3) billing subscribers; (4) interfacing with VOD system 108 to provide the latter with subscriber authorization status, and to collect video on demand purchase information from the latter; and (5) providing subscriber authorization status, service and event definition information, and to collecting purchase information.

Encryption Renewal System (ERS)

As shown in FIG. 1, ERS 104 interfaces with CPS 102, VOD system 108 and CAS 110. ERS 104 enables pre-encrypted content to be distributed to VOD system 108 and other authorized VOD system entities while enabling access control within each CAS 110. The ERS performs ECM renewal (ECM retrofitting) in synchronization with category epoch rollover events occurring within each participating CAS 110.

Encrypted content from the CPS is unusable until an initial ECM "renewal" operation is performed. To make the content usable for the first time, VOD system 108 contacts ERS 104 to obtain the first set of ECMs. Henceforth, ECM renewal is performed periodically to keep valid ECMs associated with each content title on the VOD system. ERS 104 functions include: generating encryption control parameters for initializing OLES devices, communicating with the CAS in different point to point systems, accepting requests from a VOD system to generate ECMs for pre-encrypted content, computing retrofitted ECMs, sending retrofitted ECMs to the requesting VODS, and maintaining databases of appropriate parameters. ERS 104 may also interface with VOD system 108 to forward information about (scheduled) periodical key changes to VOD system 108.

ERS 104 is implementable using hardware, software or a combination of both. For example, a number of platforms such as Sun/Solaris™ and coding language such as Java™ or servers like Apache Group's Apache™, Sun and Netscape's alliance product: iPlanet™, and operating environments such as Windows NT™, may be employed in the present invention.

Distribution Network

Distribution Network 112 is a point-to-point network that distributes signals to all or a subset of the subscribers in the system. Distribution Network 112 may comprise hybrid fiber-coax (HFC) technology, for example. In an HFC network, for example, broadcast signals are distributed from the head end (central office) to a number of second level facilities (distribution hubs). Each hub in turn distributes carriers to a number of fiber nodes. In a typical arrangement, the distribution medium from the head-end down to the fiber node level is optical fibers. Subscriber homes are connected to fiber hubs via coaxial cables. At some level of distribution facility (hub, fiber node, or other distribution facilities), video on demand carriers are broadcast to a subset of the subscriber terminal population served by the distribution facility. This typically occurs at the fiber node level. This arrangement allows the reuse of video on demand carrier frequencies, say across fiber nodes, because different fiber nodes broadcast different video on demand carriers to the subscribers they serve.

Interactive Network

Interactive network 114 is communicably coupled to VOD system 108 and set top population 120 to provide a two-way communication capability between the subscriber terminals and the VOD system 108. Interactive Network 114 may share some of the physical infrastructure of Distribution Network 112.

On Demand Delivery of Content to Subscribers

A subscriber located within settop 120 wishing to purchase content invokes the VOD Client Application on the subscriber terminal (not shown). The VODCA presents a user interface to the subscriber, allowing the subscriber to select from a menu of purchasable items. The subscriber invokes a VODCA function to make a purchase, after which a purchase request is forwarded to VOD system 108. The purchase request includes information about the subscriber and the item being purchased. VOD system 108 checks for availability of resources needed to fulfill the purchase, as well as the authorization status of the subscriber.

If resources are available and the subscriber is authorized according to the access control policy, the purchase request is approved. Otherwise the request is denied and the process is terminated. If the request is approved, VOD system 108 communicates the approval status of the purchase to the subscriber and allocates and assigns resources to the VOD session, including data path and carrier bandwidth. Further, VOD system 108 communicates to settop 120 information needed for service acquisition, e.g., a virtual channel number (an identifier that has correspondence to carrier frequency and the identification of the program within a transport multiplex). Settop 120 performs tuning and service acquisition. VOD system 108 looks up its database to retrieve entitlement control messages associated with the pre-encrypted program which are then streamed with the program to settop 120.

Renewing ECMs

ECM retrofitting is the process of generating ECMs for pre-encrypted contents so that they are useable in different cable systems and despite periodical key changes. It is performed by a server hosted in ERS 104, which is a secure environment. Content is encrypted prior to a request from a subscriber terminal. ERS 104 provisions the offline encryption devices in CPS 102 with encryption control parameters, which, among other functions, enable ERS 104 to retrieve information from encryption records generated by the CPS. This provisioning need be done only infrequently, or possibly just once. It need not be done with every ECM retrofitting request from the VOD system 108.

Next, an encryption record of parameters for encrypting the content is generated. VOD system 108 establishes a secured connection to ERS 104. To make a pre-encrypted program usable in a particular system for a particular period, VOD system 108 sends the encryption record to ERS 104 which checks the authorization status of the requested content from VOD system 108. If the authorization check fails, ERS 104 terminates the session. Otherwise, the process continues. ERS 104 generates one or more ECMs for the pre-encrypted program using the periodical key associated with the cable system (and possibly other parameters required by the CAS). The ECM(s) are created in such a way that they will be valid until the periodical key of the target system changes again. ERS 104 sends the retrofitted ECM(s) and pre-encrypted content to the subscriber via VOD system 108.

Figure 2:
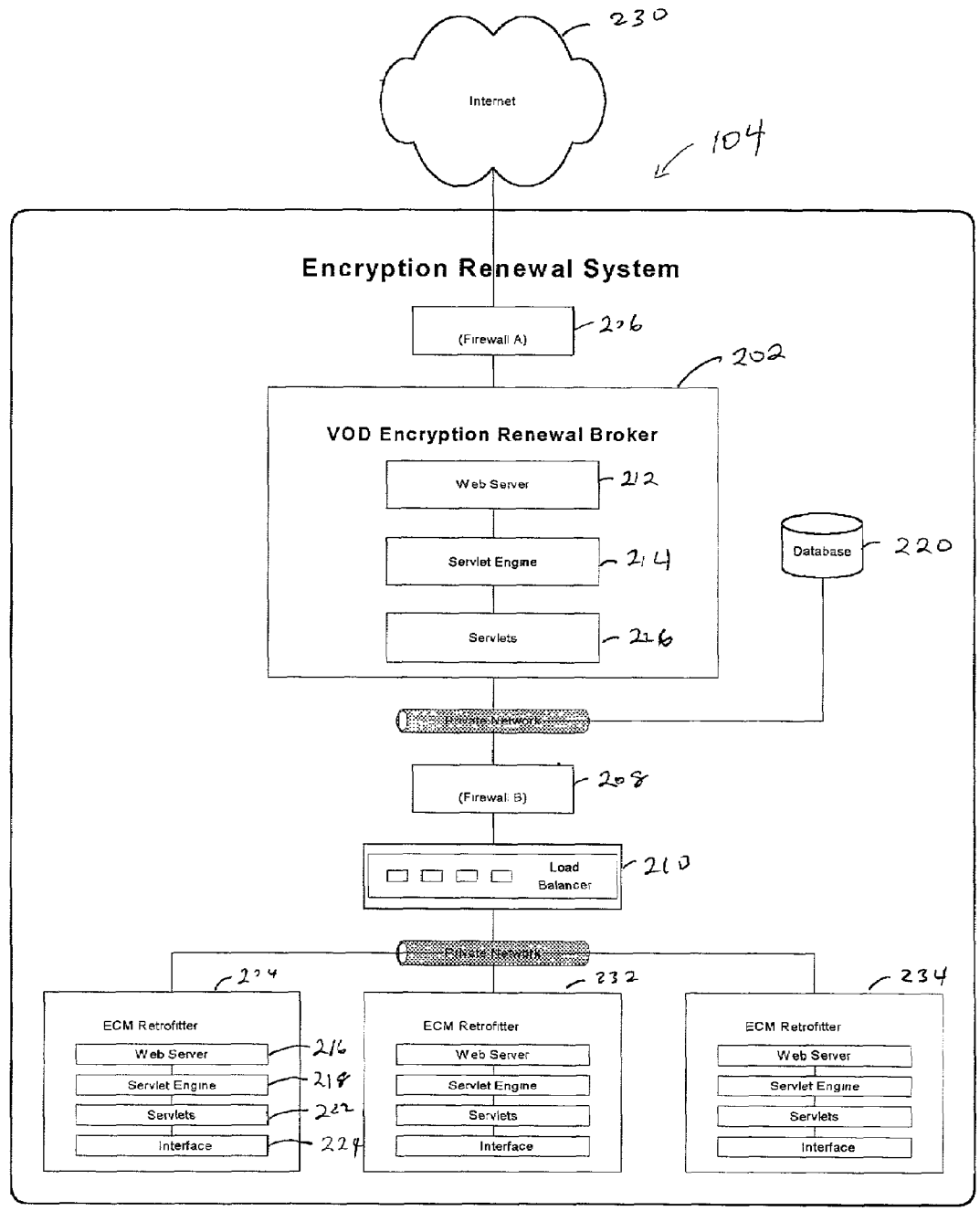
FIG. 2 is an exemplary system architecture of the encryption renewal system of FIG. 1 for generating ECMs in accordance with an alternate embodiment of the present invention.

FIG. 2 is an exemplary system architecture of ERS 104 (FIG. 1) for generating ECMs in accordance with an alternate embodiment of the present invention. As shown, ERS 104 contains two computing platforms that are physically separated to provide enhanced security against unauthorized access.

Among other components, ERS 104 includes a first computing platform referred to as a VERB (VOD encryption renewal broker) 202 for performing non-secure tasks associated with ECMs; a second computing platform containing one or more ECM retrofitters 204, 232, 234 (secure ECM retrofitter) for performing secure tasks associated with the ECMs. VERB 202 consists of a web server 212, a servlet engine 214 and servlets 216. ERS 104 further comprises a firewall 206 for enhancing security between VERB 202 and Internet 230 traffic; a firewall 208 between VERB 202 and the ECM retrofitters; a database 220 for storing cryptographic keys; and a load balancer 210. ECM retrofitter 204 contains a web server 216; servlet engine 218; servlets 222 and a PCI interface 224. ECM retrofitters 232 and 234 contain components functioning in the same manner as those contained in ECM retrofitter 204. Moreover, it should be noted that each of ECM retrofitters 204, 232 and 234 is detachably coupled to VERB 202.

In operation, Internet 230 traffic from VOD systems (not shown) are filtered through firewall 206 before reaching VERB 202. Such traffic may include a request for an ECM request, provided in XML (extensible mark-up language), for example. VERB 202 parses the request, looks up cryptographic key information required to generate the ECM in database 220 and communicates with the ECM retrofitters as necessary to fulfill the request. An ASIC (application specific integrated circuit) security chip (not shown) by Motorola, Inc. resides in each of the ECM retrofitters for generating the ECM. The ECM is generated in any one of the ECM retrofitters and returned to the requesting VOD system by way of VERB 202.

In FIG. 2, more specifically, firewall 206 provides the basic interface to, and protection from, the public Internet 230. It is typically a commercial firewall product, modified as proves necessary for the present invention. VOD systems (not shown) are permitted access to VERB 202 through firewall 206 in order to request ECM retrofits as well as other requests. As noted, VERB 202 is the basic platform for the non-secure processing for the ECM retrofitting. In addition, it implements synchronization, registration of OLES and CASs, and CAS updates. Other components such as web server 212 may be a commercial web server product, for example, modified as proves necessary for the present invention. Servlet engine 214 coordinates and connects with the web server, and dispatches web server requests to servlet 226 and may be commercially available.

Web server 212 and servlet engine 214 dispatch VOD requests to servlets 226 code, which does all the processing to satisfy each request. Processing includes parsing the requests, accessing the database, and dispatching secure requests to ECM retrofitter 204. Firewall 208 provides the interface between VERB 202 and the ECM retrofitter 204. VERB 202 is permitted access to ECM retrofitter 204 (or 232, 234 as appropriate) through the firewall in order to request secure computations such as ECM retrofits, CAS updates, and OLES registration. Load Balancer 210 distributes the load of VERB 202 requests to the various ECM retrofitters, based on load.

ECM retrofitter 204 is the platform for the secure processing for the ECM retrofitting, synchronization, OLES and CAS registration, and CAS updates. Web server 216 accepts requests from VERB 202. Servlet engine 218 coordinates and connects with web server 216, and dispatches web server requests to servlets 222 code. It is a commercial product (and may be a part of the web server for some implementations). Servlets 222 contain custom implementation of the non-secure portions of the ECM retrofitter functionality (i.e., getting the requests to and from the security chip). Web server 216 and servlet engine 218 dispatch VERB 202 requests to servlets 222 code, which does all the processing to satisfy each request. Processing includes parsing the requests and accessing the ASIC chip via interface 224. Interface 224 which may be a PCI interface for example, is interfaced with the security chip contained in ECM retrofitter 204.

It should be observed that the security chip is a customized ASIC with custom firmware unlike related art systems that handle security using software. Moreover, the security chip is within a computing platform separate from a publicly accessible platform. That is, all external requests must proceed through VERB 202, the first computing platform. Only after the requests are processed by VERB 202, are the requests forwarded to ECM retrofitter 204. ECM retrofitter 204 handles all secret information such as the clear keys (unencrypted form) inside the chip, and the keys are always encrypted prior to forwarding outside the chip. In this fashion, clear information is maintained confidential and relatively safe from unauthorized access. Furthermore, even where a security breach is suspected, ECM retrofitter 204 may be physically disconnected relatively quickly since the ECM retrofitter is detachably coupled to VERB 202.

Figure 3:
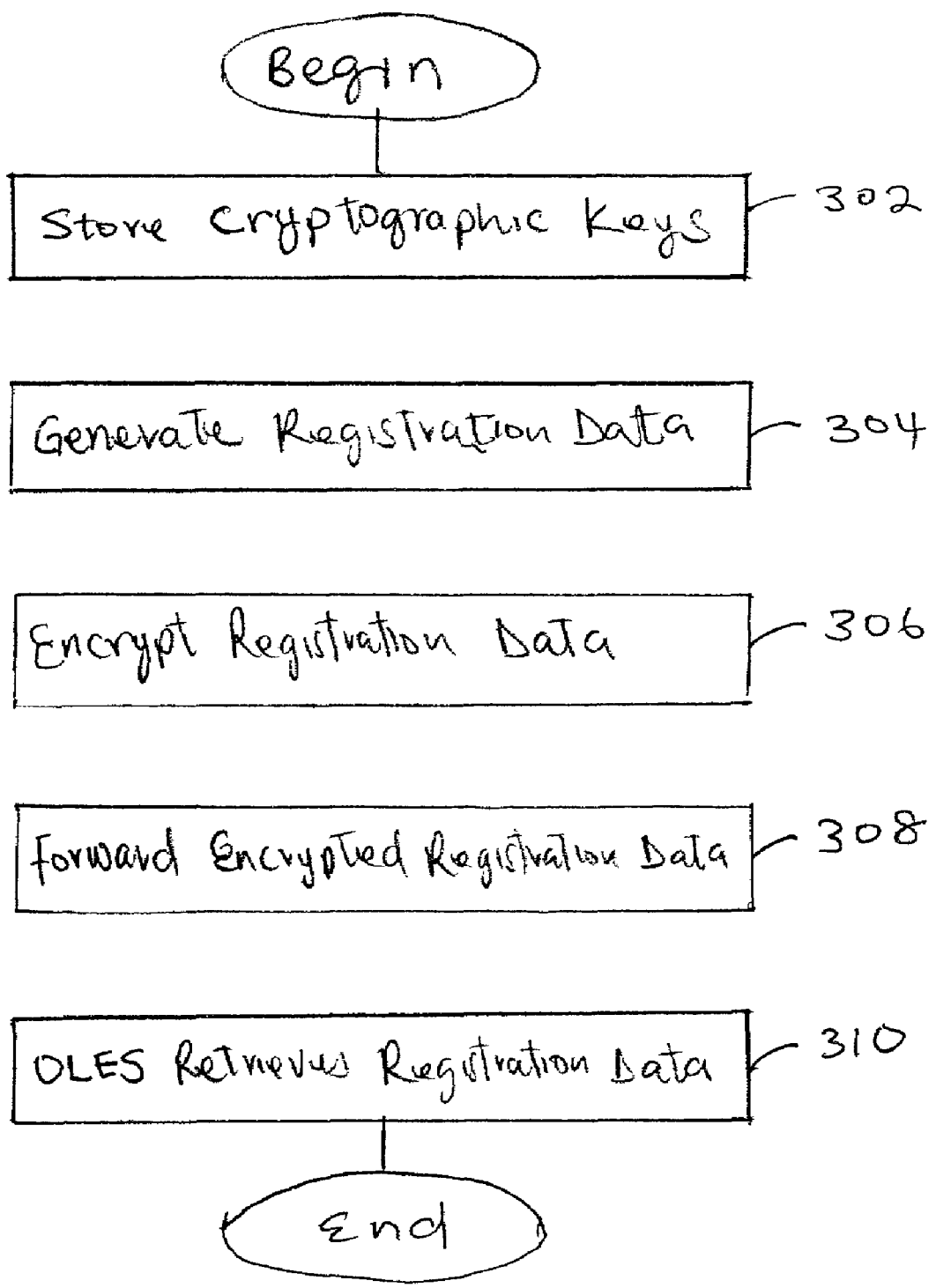
FIG. 3 is a flow diagram of a method for activating an off-line encryption device to begin encryption according to a first embodiment of the present invention.

FIG. 3 is a flow diagram of a method for activating an OLES (within CPS 102, not shown) to begin encryption according to a first embodiment of the present invention.

In FIG. 3, the method begins when the OLES is manufactured. At this point, the OLES is not operational and cannot be used to encrypt clear content.

At block 302, one or more cryptographic keys are stored in the OLES at manufacture time. Cryptographic keys are also stored at manufacture time, in ERS 104 which implements the present method in conjunction with the OLES. In one embodiment, the cryptographic keys are secret shared keys when a symmetric key system is employed. In addition to employing a symmetric key system, two public key systems are utilized. In a first public key system (registration), a public and a private key are stored in the OLES while the private key is forwarded to ERS 104 for storage. A second public key system (signing) is utilized so that a public and a private key are stored in the OLES while the private key is forwarded to ERS 104 for storage. Although not shown, one of ordinary skill in the art will realize that other comparable key systems may be employed either as substitutes or in addition to the aforementioned key systems.

At block 304, the step of generating registration data for registering the OLES is illustrated. The OLES having been acquired by a consumer is ready for activation (to encrypt clear content). Without activation, the OLES cannot become operational. To activate the OLES, ERS 104 begins by generating registration data which contains encryption keys for encrypting the clear content. Other related information and operating parameters are also contained in the registration data. Because ERS 104 implements ECM retrofitting, it is responsible for providing the registration data used by the OLES to encrypt clear content. Thus, the OLES may not randomly generate its own encryption keys and/or parameters because ERS 104 will be unaware of such information during the retrofitting process. Thus, at registration time, ERS 104 determines the encryption keys and associated encryption algorithm, operating parameters, etc. The operating parameters include operating mode, number of encryption sessions, etc. In one embodiment, the operating parameters are determined by VERB 202 (FIG. 2). A human operator, however, may manually determine the operating parameters. Once determined, the parameters are entered via a GUI (graphical user interface), for example. Typically, the number of encryption sessions are determined by the number of sessions purchased by the consumer. It should be observed that while the operating parameters are determined either manually or by VERB 202, the encryption keys and associated information are securely generated within ECM retrofitter 204 (FIG. 2) as further described below.

At block 306, the step of encrypting the registration data with one or more cryptographic keys to form encrypted registration data is shown. After generation, the registration data is clear. Using the stored cryptographic keys, ERS 104 encrypts the registration data. As noted, the encryption (and generation of the encryption keys) are performed inside ECM retrofitter 204. This ensures complete integrity of the registration data. Since the operating parameters are generated external to the ECM retrofitter 204, the registration data is encrypted only after ECM retrofitter 204 receives the operating parameters from VERB 202. Thus, while information may be received in clear form, all information leaving ECM retrofitter 204 is encrypted.

To encrypt the registration data, ERS 104 applies the stored shared secret key to clear registration data to produce an authenticator. Thereafter, the public key (signing) is used to generate a signature from the authenticator. The authenticator ensures that alteration to the encrypted/decrypted registration data are detected and the signature verifies that the authenticator is generated by the OLES. After the authenticator signature is generated, the ensuing encrypted registration data is encrypted using the public key (registration) stored in ERS 104 prior to forwarding the encrypted registration data.

At block 308, the step of forwarding the encrypted registration data to the OLES is depicted. The registration data may be forwarded manually (e.g. a diskette) or via a communication network. The communication network may be fiber, telephone, or a satellite network, for example.

At block 310, the step of retrieving the registration data from the encrypted registration data is shown, at which point, the OLES may begin to encrypt clear content. The registration data is retrieved by following the reverse of the steps described at block 306, above. In this manner, the present method permits activation of an OLES after it is acquired by a consumer to begin encrypting clear content.

While the above is a complete description of exemplary specific embodiments of the invention, additional embodiments are also possible. Thus, the above description should not be taken as limiting the scope of the invention, which is defined by the appended claims along with their full scope of equivalents.

What is claimed is:

1. In a cable system, an encryption renewal system for generating one or more entitlement control messages, the messages containing cryptographic keys for allowing a subscriber set-top box to decrypt content encrypted off-line, the entitlement control message being forwarded with the content to the subscriber terminal, the encryption renewal system comprising:
   a first computing platform for receiving a request to generate the entitlement control messages, the first computing platform performing non-secure tasks associated with the entitlement control messages;
   a second computing platform physically separate from the first computing platform for generating the entitlement control messages, the second computing platform performing secure tasks associated with the entitlement control messages; and
   one or more firewalls between the first and the second computing platforms for enhancing security of the encryption renewal system, the first computing platform forwarding the entitlement control messages to enable the subscriber set-top box to de-crypt the pre-encrypted content.

2. The system of claim 1 wherein the second computing platform further comprises an application specific integrated circuit chip for generating the entitlement control messages.

3. An encryption renewal system comprising:
   a first computing platform for performing non-secure tasks associated with one or more control messages that transmit one or more keys to a subscriber; and
   a second computing platform physically separate from the first computing platform containing one or more application specific integrated circuit chip for generating the one or more control messages.

4. The system of claim 3 further comprising one or more firewalls between the first and the second computing platforms.

5. The system of claim 3 further comprising a database for storing the keys to be included in the control messages.

6. The system of claim 3 wherein the key is a group or periodical key from a conditional access system for controlling a population of set-top boxes.

7. The system of claim 3 further comprising a third computing platform physically separate from the first computing platform for performing secure tasks associated with the control messages.

8. The system of claim 7 wherein each of the second and third computing platforms are detachably coupled to the first computing platform.

9. The system of claim 3 wherein the second computing platform further comprises a web server accepting requests from the first computing platform to generate the control messages.

10. The system of claim 7 wherein the second and third computing platforms are initially configured to be identical.

11. The system of claim 3 wherein the second and third computing platforms are interchangeable.

12. The system of claim 3 wherein the control message is generated using the cryptographic key and an encryption record.

13. An encryption renewal system, comprising:
   means for receiving an entitlement management message containing one or more cryptographic keys which allows a subscriber of a point to point communication system to access pre-encrypted content;

means for extracting the cryptographic key from the entitlement management message, said means for extracting being physically separate from the means for receiving; and means for storing the one or more cryptographic keys, said means for receiving and means for extracting performing non-secure and secure processing, respectively, of tasks associated with extracting the one or more cryptographic keys.

14. The system of claim 13 wherein the means for extracting further comprises an application specific integrated for extracting the one or more cryptographic keys.

15. The system of claim 14 wherein the application specific integrated circuit re-encrypts the one or more cryptographic keys for external storage.

16. The system of claim 13 wherein the means for storing stores information about which video on demand system associated with the conditional access system.

17. A method of registering an off-line encryption device in order to begin encrypting clear content, the method using a remotely located encryption renewal system, the method comprising:

generating registration data for registering the off-line encryption device;

encrypting the registration data with one or more cryptographic keys to form encrypted registration data;

forwarding the encrypted registration data to the off-line encryption device; and retrieving, by the off-line encryption device, the registration data from the encrypted registration data, wherein the off-line encryption device begins to encrypt the clear content intended for and only after the registration data is retrieved.

18. The method of claim 17 further comprising storing the one or more cryptographic keys prior to generating data.

19. The method of claim 17 wherein the data contains both cryptographic keys and one or more operating parameters for the off-line encryption device.

20. The method of claim 19 wherein the operating parameter is a maximum number of encryption sessions allocated to the off-line encryption device.

21. The method of claim 17 where the step of generating further comprises determining the operating parameters of the off-line encryption device.

22. The method of claim 18 wherein the storing one or more cryptographic keys further comprises, storing the one or more cryptographic keys in the off-line encryption device; and storing the one or more cryptographic keys in the encryption renewal system.

23. The method of claim 19 further wherein the one or more cryptographic keys include any one or more of a secret shared key, a private key, and a public key.

24. The method of claim 17 wherein the clear content is audio or video content intended for a user.

* * * * *